(12) United States Patent
Ono et al.

(10) Patent No.: US 9,144,910 B2
(45) Date of Patent: Sep. 29, 2015

(54) BIOSAFETY CABINETRY

(75) Inventors: Keiichi Ono, Tainai (JP); Tomotaka Kodama, Shibata (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 852 days.

(21) Appl. No.: 13/186,807

(22) Filed: Jul. 20, 2011

(65) Prior Publication Data

US 2012/0019110 A1    Jan. 26, 2012

(30) Foreign Application Priority Data

Jul. 20, 2010 (JP) ................................. 2010-163031

(51) Int. Cl.
*B25J 21/02* (2006.01)
(52) U.S. Cl.
CPC ...................... *B25J 21/02* (2013.01)
(58) Field of Classification Search
CPC ...... B25J 21/02; B08B 15/023; F24F 11/022; B01L 1/00; B01L 1/02; B01L 1/50
USPC ........... 454/49, 50, 56, 57, 58, 59, 60, 61, 62, 454/63, 64, 65, 66, 67; 312/1; 160/31, 197, 160/198, 202, 221; 600/21
See application file for complete search history.

(56) References Cited

U.S. PATENT DOCUMENTS

| | | | | |
|---|---|---|---|---|
| 3,498,687 A | * | 3/1970 | Diccianni | 312/1 |
| 3,811,250 A | * | 5/1974 | Fowler, Jr. | 96/422 |
| 5,090,303 A | * | 2/1992 | Ahmed | 454/58 |
| 5,316,733 A | * | 5/1994 | Rune et al. | 422/565 |
| 5,860,711 A | * | 1/1999 | Kronberg et al. | 312/1 |
| 6,010,400 A | * | 1/2000 | Krainiak et al. | 454/187 |

FOREIGN PATENT DOCUMENTS

JP    2007-163053    6/2007

OTHER PUBLICATIONS

Microflow Class III/I ABS Cabinet, https://web.archive.org/web/20080609012125/http://www.astec-microflow.co.uk/Microflow.asp?id=15, Jun. 9, 2008.*

* cited by examiner

*Primary Examiner* — Gregory Huson
*Assistant Examiner* — Dana Tighe
(74) *Attorney, Agent, or Firm* — McDermott Will & Emery LLP (57) ABSTRACT

The workability of operation to be performed, while preventing chemical or biological contamination, using a biosafety cabinet and gloves attached to the cabinet is improved. A biosafety cabinet includes a workspace formed in a main body cabinet thereof. Air in the workspace is discharged to outside via filters. A vertically movable front shutter is disposed on a front of the workspace. A front opening is formed below the front shutter to be at a front of the workspace. The front shutter includes plural laterally movable small windows which are overlapped like layered sliding doors. One of the plural small windows is provided, on the workspace side thereof, with a pair of glove ports to which a pair of gloves for use in operation in the workspace can be air-tightly attached.

15 Claims, 7 Drawing Sheets

BIOSAFETY CABINETRY

CLAIM OF PRIORITY

The present application claims priority from Japanese application 2010-163031 filed on Jul. 20, 2010, the content of which is hereby incorporated by reference into this application.

BACKGROUND OF THE INVENTION

The present invention relates to draft chambers, class II biohazard safety cabinets, and chemical hazard safety cabinets (may hereinafter be referred to collectively as "biosafety cabinets") and, more particularly, to a biosafety cabinet suitable for use in handling contaminants in a workspace formed therein.

Draft chambers, cabinets for use in the nanotechnological field, and chemical hazard safety cabinets (may hereinafter be referred to collectively as "biosafety cabinets") include, in many cases, an internal workspace where operation can be performed. A cabinet having such a workspace includes a front shutter and a front opening formed below the front shutter. An operator can extend his/her arms through the front opening into the cabinet and handle, for example, nanomaterial or chemically contaminated material. To prevent the operator from being contaminated by nanomaterial or chemically contaminated material, a flow of inward air being sucked into the cabinet or an air barrier is formed in the front opening.

To more strictly prevent contaminants from coming into contact with the operator, material to be handled is placed in a glove box making up an air-tight workspace, then the operator inserts his/her arms in hand-shaped gloves attached to the front of the workspace separating the workspace from the outside space and handles the material via the gloves. In the case of a chemical hazard safety cabinet or glove box, a high efficiency particulate air (HEPA) filter is used to remove contaminants generated in the workspace so as to safely discharge only clean air to outside the cabinet or glove box. An example of such an existing type of biosafety cabinet is disclosed in Japanese Patent Laid-Open No. 2007-163053.

BRIEF SUMMARY OF THE INVENTION

When an existing type of biosafety cabinet as described above is used, an operator extends his/her arms through glove insertion ports formed in the front of a workspace and handles contaminants placed on a work surface disposed in the workspace. In this type of biosafety cabinet, the positions of the gloves worn by the operator are fixed, so that there are cases in which the location in the workspace where the material to be handled can be placed is restricted or in which the operator's performance is restricted depending on his/her body type. Note that the glove positions are fixed as a result of attaching importance to the air-tightness of the biosafety cabinet. In fact, the biosafety cabinet incorporates strict measures against chemical contamination and biohazards.

The present invention has been made in view of the above problem, and it is an object of the present invention to improve the workability of operation to be performed, while preventing chemical or biological contamination, using a biosafety cabinet and gloves attached to the cabinet. Another object of the present invention is to improve the workability of operation to be performed, while taking measures against biohazards and chemical hazards, using a biosafety cabinet and gloves attached to the cabinet.

To solve the above problem, the present invention provides a biosafety cabinet comprising an air exhaust unit for discharging air in a workspace formed in a main body cabinet to outside via a filter, a front shutter vertically movably installed on a front of the workspace, and a front opening formed below the front shutter at a front of the workspace. In the biosafety cabinet, the front shutter is provided with a plurality of small windows which are laterally movable and which are overlapped like layered sliding doors. One of the plurality of small windows is provided, on the workspace side thereof, with a pair of glove ports to which a pair of gloves for use in operation in the workspace can be air-tightly attached.

The biosafety cabinet according to the present invention may be configured such that only one of the plurality of small windows is attached with a pair of the gloves or such that two of the plurality of small windows are each attached with one of the gloves. Also, in the biosafety cabinet, a holding groove may be provided on each lateral side of the front opening, the holding groove being for removably holding a corresponding lateral end portion of a laterally outermost one of the plurality of small windows on each side. Furthermore, the biosafety cabinet preferably further comprises a differential pressure sensor for detecting a differential pressure between a pressure in the workspace and a pressure outside the biosafety cabinet or between the pressure in the workspace and a pressure at downstream of the filter and a control unit for controlling an output of the exhaust unit according to a differential pressure signal inputted from the differential pressure sensor. Still furthermore, the biosafety cabinet may further comprise a glove panel removably installed in the front opening to be below the front shutter, the glove panel being attached with a glove.

According to the present invention, a biosafety cabinet has gloves movably attached to a front cover thereof, so that the workability of operation to be performed, while preventing chemical contamination or biological contamination, using the gloves can be improved. Also, the workability of operation to be performed, while taking measures against biohazards or chemical hazards, using the gloves attached to the biosafety cabinet can be improved.

DETAILED DESCRIPTION OF THE EMBODIMENTS

With reference to drawings, embodiments, according to the present invention, of chemical hazard safety cabinets which are among biosafety cabinets will be described below. Needless to say, the present invention can also be applied to other types of biosafety cabinets.

First Embodiment

Figure 1A:
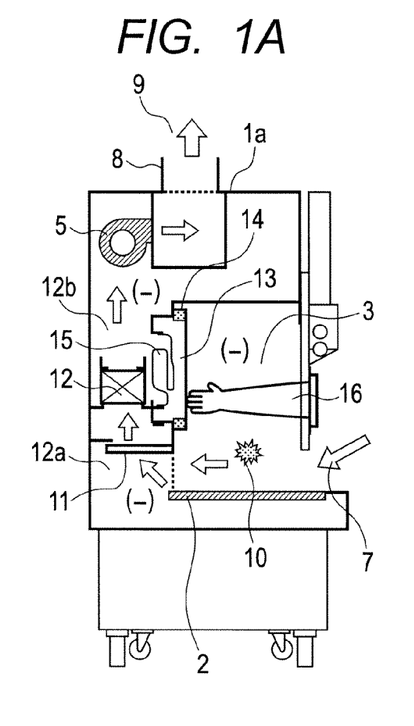
FIGS. 1A and 1B show a chemical hazard safety cabinet according to an embodiment (a first embodiment) of the present invention, FIG. 1A being a longitudinal sectional view and FIG. 1B being a front view.
Figure 1B:
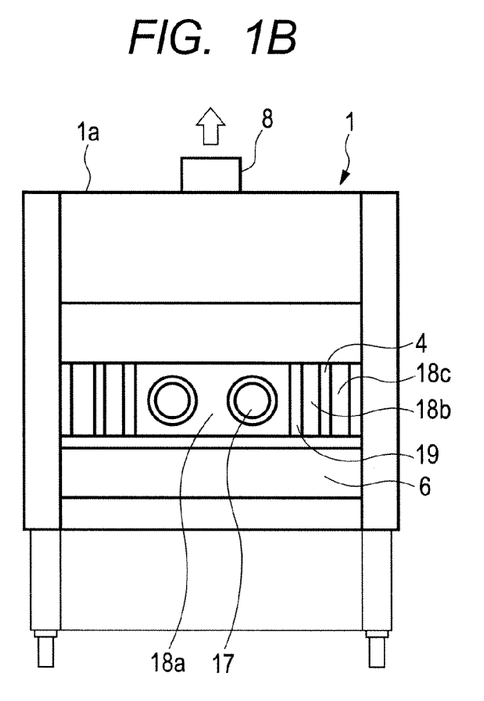

With reference to FIGS. 1A-1B to FIGS. 5A-5D, a first embodiment of a chemical hazard safety cabinet according to the present invention will be described below. FIGS. 1A and 1B show a chemical hazard safety cabinet 1, FIG. 1A being a longitudinal sectional view and FIG. 1B being a front view. The cabinet 1 has a front shutter 4 vertically movably installed on a front of a workspace 3 formed inside a main body case 1a. When the front shutter 4 is lifted, a front opening 6 of the workspace 3 appears below the front shutter 4. When the front shutter 4 is in a lowered position, the front opening 6 is closed.

A HEPA filter path 12a is formed in upper and lower portions, behind the workspace 3, of the interior of the main body case 1a. The HEPA filter path 12a is used to filter contaminants and dust generated in the workspace 3 for air purification. In an upper portion of space behind the workspace 3, a plastic bag 15 for accommodating the contaminated HEPA filter 12 is held. A space 12b on the downstream side of the HEPA filter 12 is a clean space separated from the workspace 3 by a HEPA filter cover 13. The HEPA filter cover 13 is fitted with a packing 14 for enhanced sealing.

A wire mesh is installed in a lower back side of the workspace 3 to prevent the operator's hands from entering the HEPA filter path 12a. In the portion corresponding to the workspace 3 of the HEPA filter path 12a, a prefilter 11 and the HEPA filter 12 are disposed with the latter being above the former. A blower 5 is attached upward of the HEPA filter 12. An exhaust port 8 is formed in the main body case 1a to be on the outlet side of the blower 5. The bottom of the workspace 3 is used as a work surface 2.

In the chemical hazard safety cabinet 1 constructed as described above, air flows as follows. Ambient air is introduced into the cabinet 1 through the front opening 6 formed below the front shutter 4 and forms an inward air flow 7. The inward air flow 7 enters the workspace 3 and is sucked in to pass the prefilter 11 to have contaminants 10 contained in the air removed by the HEPA filter 12. The HEPA-filtered air is then sucked in by the blower 5 to be discharged as exhaust air 9 through the exhaust port 9 formed in the main body case 1a. The operator, not shown, extends his/her arms into the workspace 3 through the front opening 6 and handles the contaminants 10, i.e. samples, in the workspace 3. The inward air flow 6 formed at the front opening 6 prevents the contaminants 10 generated in or brought into the workspace 3 from leaking out of the cabinet 1.

The front shutter 4 has small windows 18a to 18c formed therein. The small windows 18a to 18c are horizontally movable in the front shutter 4. They are made of a transparent material, for example, glass, so that the interior of the workspace 3 can be seen from outside the cabinet 1.

When the blower 5 is operated, the inward air flow 7 to be sucked into the cabinet 1 is formed at the front opening 6 making the pressure inside the workspace 3 negative (−). With the inward air flow 7 formed, when the operator extends his/her arms through the front opening 6 to handle the contaminants 10 in the workspace 3, neither the contaminants 10 are inhaled by the operator nor they leak out of the cabinet 1.

The contaminants 10 handled in the workspace 3 are removed by the prefilter 11 and the HEPA filter 12, allowing only clean air to be discharged from the exhaust port 8. This causes the contaminants 10 to be accumulated at the HEPA filter 12. Eventually, the HEPA filter 12 is clogged and becomes unable to satisfactorily pass air. When this occurs, it is necessary to replace the HEPA filter 12.

To remove the HEPA filter 12, remove the HEPA filter cover 13 provided on the workspace 3 side of the plastic bag 15 that is disposed on the front side of the HEPA filter 12, then take out the HEPA filter 12 holding it via the plastic bag 15 while covering the HEPA filter 12 with the plastic bag 15.

In this way, the operator can take out the HEPA filter 12 enclosed in the plastic bag 15 without touching the contaminants 10 collected by the HEPA filter 12. This procedure is used in cases where there is no means of effectively neutralizing the contaminants 10 collected by the HEPA filter 12. How to install a new HEPA filter 12 after removing the old HEPA filter 12 will be omitted in this specification.

Figure 2A:
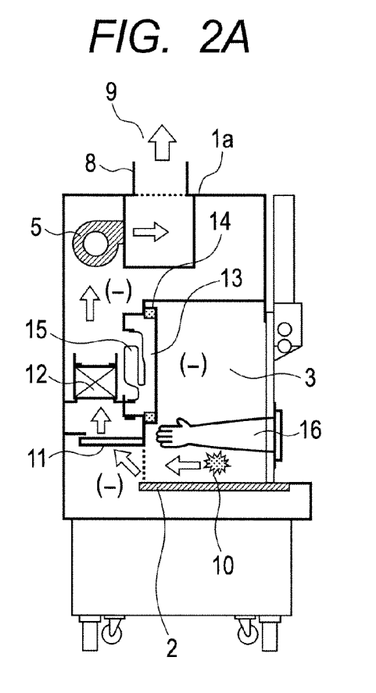
FIGS. 2A and 2B show the cabinet shown in FIGS. 1A and 1B in a state with a front shutter thereof closed, FIG. 2A being a longitudinal sectional view and FIG. 2B being a front view.
Figure 2B:
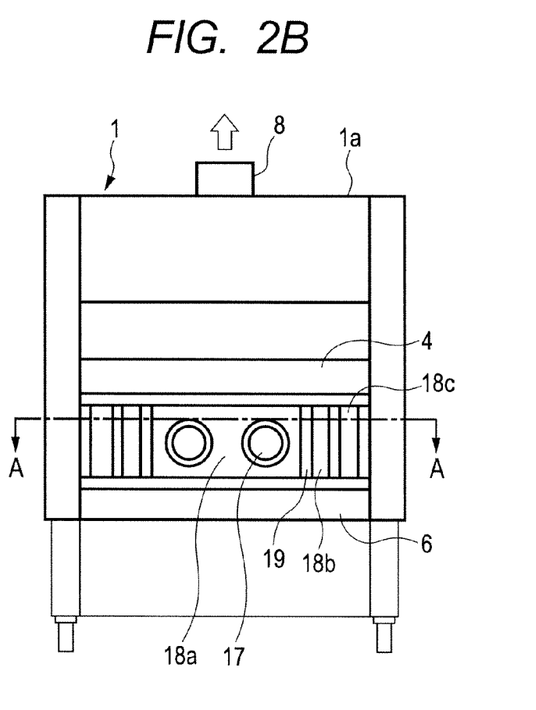

FIGS. 2A and 2B show the chemical hazard safety cabinet 1 shown in FIGS. 1A and 1B in a state with the front shutter 4 closed, FIG. 2A being a longitudinal sectional view and FIG. 2B being a front view. When, as shown in FIGS. 1A and 1B, the front opening 6 is open, the operator can extend his/her arms into the workspace 3 through the front opening 6 and handle the contaminants 10 with the inward air flow 7 preventing the contaminants 10 from leaking out. In cases where, in handling the contaminants 10, the air barrier effect of the inward air flow 7 only is not regarded satisfactory as means of separating the workspace 3 from outside the cabinet 1, the front shutter 4 is closed as shown in FIGS. 2A and 2B.

The small transparent windows 18a to 18c provided in the front shutter 4 are horizontally movable in the front shutter 4. The small window 18a includes glove ports 17 to which gloves 16 are air-tightly attached, so that the operator can handle the contaminants 10 in the workspace 3 via the gloves 16. In this state, the inward air flow 7 sucked in by the blower 5 enters the workspace 3 through the clearance between the front shutter 4 and the main case 1a making the pressure inside the workspace 3 negative.

In the above-described way, with the front opening 6 closed between the operator and the workspace 3, the possibility of the contaminants 10 leaking out toward the operator is extremely reduced. Moreover, the contaminants 10 are handled via the gloves 16, so that the operator does not come in direct contact with the contaminants 10.

Figure 3A:
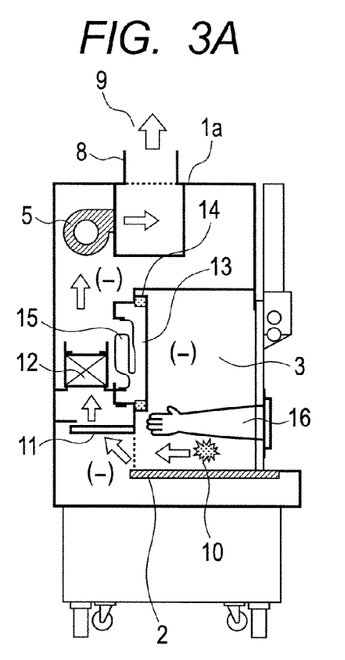
FIGS. 3A and 3B show the cabinet shown in FIGS. 1A and 1B in a state with gloves moved left, FIG. 3A being a longitudinal sectional view and FIG. 3B being a front view.
Figure 3B:
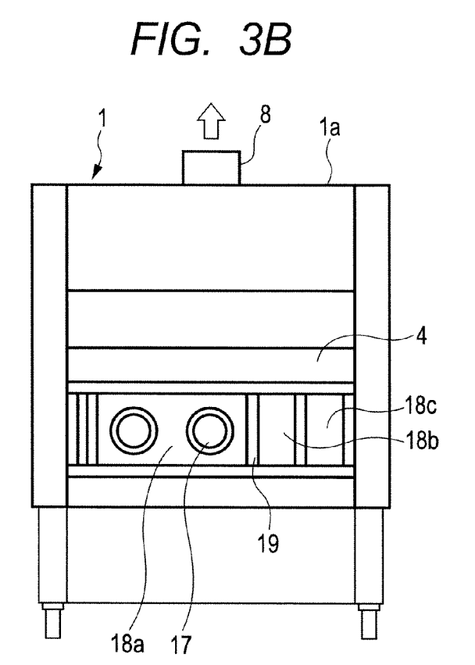
Figure 4:
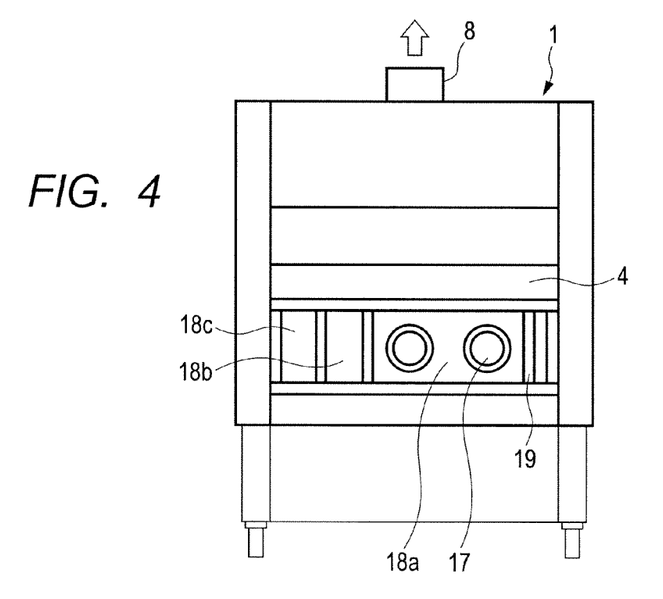
FIG. 4 is a front view of the cabinet shown in FIGS. 1A and 1B with the gloves moved right.

With reference to FIGS. 3A and 3B, FIG. 4, and FIGS. 5A to 5D, the horizontal movement of the small windows 18a to 18c will be described below. FIGS. 3A and 3B show the cabinet 1 in a state in which the front shutter 4 is closed and the small window 18a including the glove ports 17 has been moved to the left to allow the small windows 18b and 18c on the right side to be used. FIG. 4 shows the cabinet 4 in a state in which the small window 18a including the glove ports 17 has been moved to the right to allow the small windows 18b and 18c on the left side to be used. Of FIGS. 3A and 3B, FIG. 3A is a longitudinal sectional view and FIG. 3B is a front view.

When the cabinet is in the state shown in FIGS. 2A and 2B, the gloves 16 are positioned in a lateral center portion of the front shutter 4, so that there can be cases where the operator cannot reach a side of the workspace 3. To allow the operator to reach either side of the workspace 3, the horizontally movable, transparent small window 18a provided in the front shutter 4 is moved to the right or to the left as shown in FIG. 3B or as shown in FIG. 4.

Figure 5A:
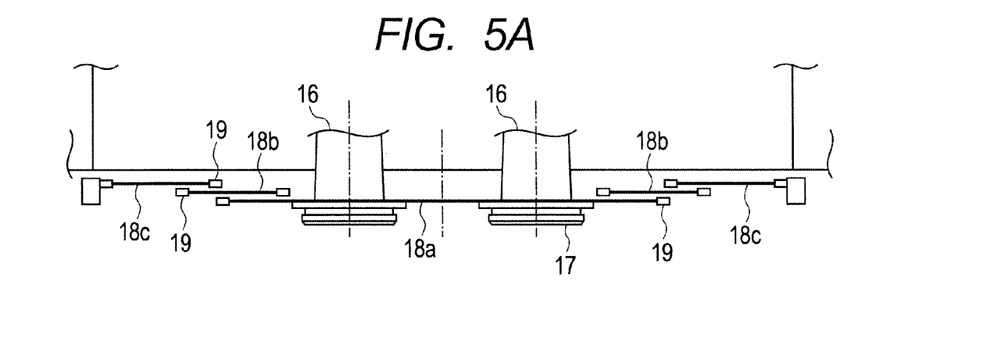
FIGS. 5A to 5D show the front shutter of the cabinet shown in FIGS. 1A and 1B, FIGS. 5A and 5B being horizontal sectional views and FIGS. 5C and 5D being partial horizontal sectional views.
Figure 5B:
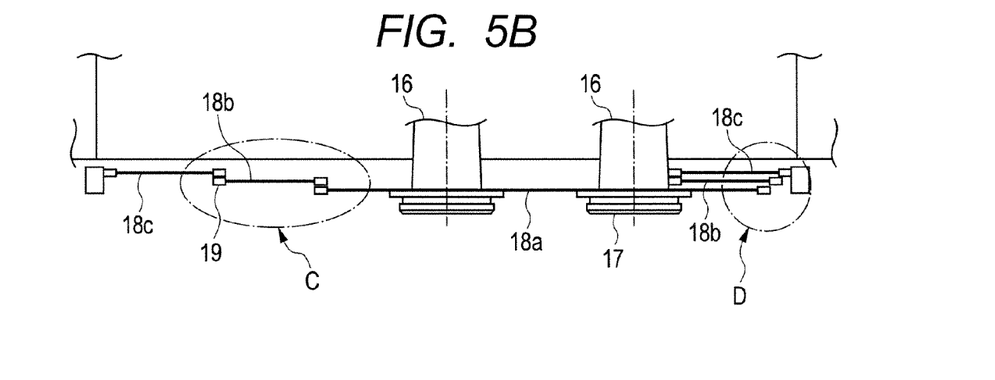
Figure 5C:
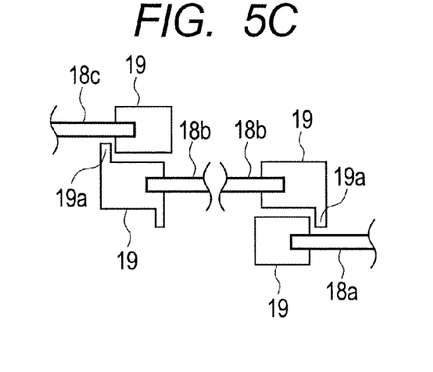
Figure 5D:
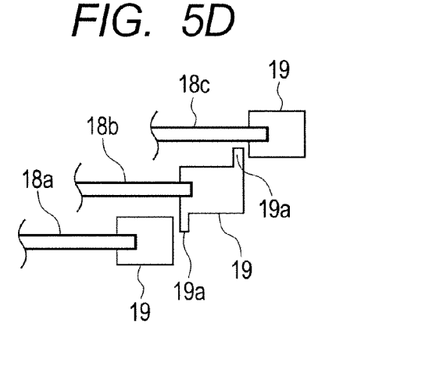

FIGS. 5A to 5D are sectional views taken along line A-A in FIG. 2B, showing how the small windows 18a to 18c are moved and positioned. In FIG. 5A, the small window 18a is shown in a lateral center position. In FIG. 5B, the small window 18a is shown moved to the right side. FIG. 5C is a detailed view of portion C of FIG. 5B. FIG. 5D is a detailed view of portion D of FIG. 5B.

The transparent small window 18a has two circular glove ports 17 air-tightly attached thereto. The glove ports 17 can each be attached with an air-tight glove 16. The small window 18a is made of a transparent plate, for example, a glass plate and is fitted with rectangular small-window frames 19 being described later.

The small windows 18b are disposed, each being like one of layered sliding doors made of glass, on both sides of the small window 18a. The small windows 18c are disposed, also each being like one of layered sliding doors made of glass, on the lateral outer sides of the small windows 18b.

On the right side of the small window 18a moved to the right side as shown in FIG. 5B, the small window 18a and the right small window 18b, and the right small window 18c are overlapped in the front-to-rear direction. On the left side of the small window 18a moved to the right side as shown in FIG. 5B, the left small window 18b is also moved rightward, but the left small window 18c, the left small window 18b, and the small window 18a remain connected by small-window frames 19, being described in the following, fitted to their lateral end portions.

The small windows 18a to 18c are, as described above, plate members, and the left and right sides of each of the small windows 18a to 18c are each fitted with a rectangular small-window frame 19. The small-window frames 19 fitted to the small windows 18b positioned between the small window 18a and the small windows 18c partly differ in shape from the small-window frames 19 fitted to the small windows 18a and 18c. Namely, of the inner (closer to the lateral center of the front shutter 4) and outer (farther from the lateral center of the front shutter 4) small-window frames 19 fitted to each of the small windows 18b, the outer small-window frame 19 has two projections 19a each having a rectangular cross-section. Of the two projections 19a, one is formed in a lateral inner end portion (lateral end portion closer to the lateral center of the front shutter 4) on the front side of the outer small-window frame 19 and the other is formed in a lateral outer end portion (lateral end portion farther from the lateral center of the front shutter 4) on the back side of the outer small-window frame 19. The inner small-window frame 19, on the other hand, has only one projection 19a formed in a lateral inner end portion on the front side thereof.

In the above configuration, when the small window 18a is moved rightward, on the left side of the small window 18a, after only the small window 18a is initially moved, the left small-window frame 19 fitted to the small window 18a comes into sliding contact with the right small-window frame 19 fitted to the left small window 18b to eventually hit the front projection 19a of the right small-window frame 19. This causes the left small window 18b to be pulled rightward by the small window 18a (see FIG. 5C). Thus, moving the small window 18a rightward causes, on the left side of the small window 18a, no opening to be formed between the small windows 18a to 18c.

On the right side of the small window 18a, as the small window 18a is moved rightward, the right small-window frame 19 fitted thereto comes to hit the front projection 19a of the right small-window frame 19 fitted to the right small window 18b to cause the right small window 18b to also move rightward. When the small window 18a eventually reaches its rightmost position, the small windows 18a to 18c are overlapped in the front-rear direction as shown in FIG. 5D.

Since the small windows 18a to 18c are bilaterally symmetrical, moving the small window 18a leftward causes, on the right side of the small window 18a, no opening to be formed between the small windows 18a to 18c, either. According to the present embodiment, the gloves 16 can be easily moved horizontally, whether to left or right. This increases the degree of freedom of operation to be performed using the gloves 16.

Second Embodiment

Figure 6A:
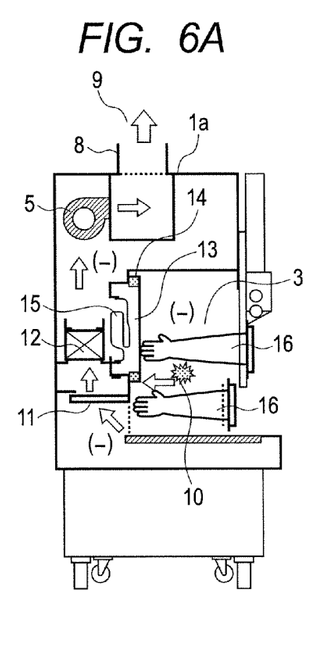
FIGS. 6A and 6B show a chemical hazard safety cabinet according to another embodiment (a second embodiment) of the present invention, FIG. 6A being a longitudinal sectional view and FIG. 6B being a front view.
Figure 6B:
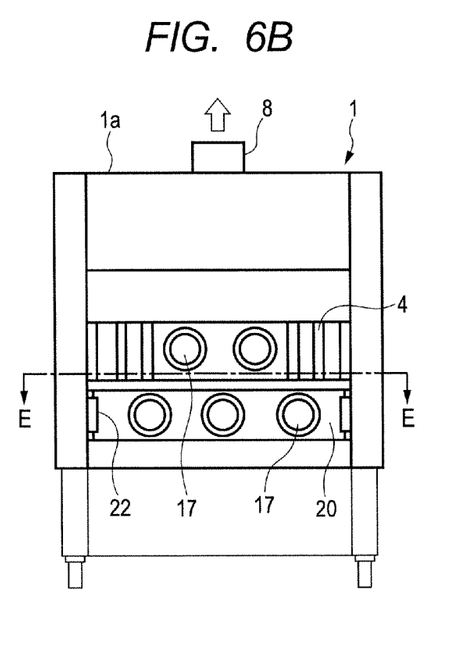
Figure 7:
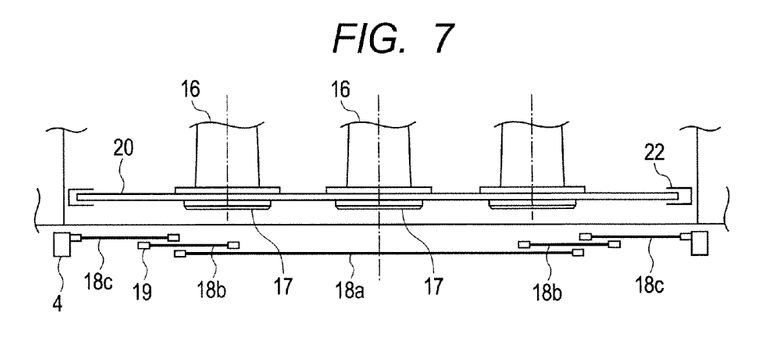
FIG. 7 is a horizontal sectional view of the front shutter of the cabinet shown in FIGS. 6A and 6B.

With reference to FIGS. 6A, 6B, and 7, a second embodiment of a chemical hazard safety cabinet according to the present invention will be described below. FIGS. 6A and 6B show a chemical hazard safety cabinet 1, FIG. 6A being a longitudinal sectional view and FIG. 6B being a front view. FIG. 7 is a sectional view, taken along line E-E in FIG. 6B, of a front shutter 4 included in the cabinet 1 shown in FIGS. 6A and 6B. The second embodiment differs from the first embodiment in that a front opening 6 is provided with a glove panel 20. Excepting this difference, the configuration of the second embodiment is the same as that of the first embodiment.

Referring to FIGS. 6A and 6B, a grooved holding member 22 is provided on each side of the front opening 6. The glove panel 20 is held, at both sides thereof, by the grooved holding members 22. The grooved holding members 22 are positioned inwardly of the front shutter 4, i.e. to be more inside a workspace 3 than the front shutter 4. The glove panel 20 is installed in position by being inserted, from above, into the grooves of the grooved holding members 22.

As shown in FIG. 7, the glove panel 20 is installed on the workspace 3 side of the front shutter 4. Thus, with the glove panel 20 installed to be more inside than being directly below the front shutter 4, the front shutter 4 can be lifted and lowered in a range where the gloves 16 attached to the front shutter 4 are not hit.

The above configuration will be effective, for example, in cases where, with the front shutter 4 completely lowered, the glove ports 17 of the front shutter 4 are positioned too low to allow the operator to conveniently use the gloves 16 attached to the glove ports 17. Even in cases where: the vertical positions of the gloves 16 attached to the front shutter 4 are appropriately adjusted; the front opening 6 is formed below the front shutter 4; and the gloves 16 are used by the operator in handling the contaminants 10; the air barrier effect of an inward air flow 7 alone might be inadequate to prevent the contaminants 10 from leaking out. In such cases, too, the above configuration can be effective.

When the front opening 6 is provided with the glove panel 20, the cabinet 1 has gloves 16 in two levels, i.e. the upper gloves 16 attached to the front shutter 4 and the lower gloves 16 attached to the glove panel 20, any combination of which can be selected by the operator depending on the type of operation to be performed or his/her body type. Also, with the plural gloves 16 provided, plural operators can simultaneously participate in operation to be performed in the workspace 3.

In cases where, without the glove panel 20 installed, the inward air flow 7 is used as an air barrier to separate the workspace 3 and the outside space, the inward air flow 7 is blocked when plural operators stand in front of the front opening 6. As a result, the air barrier effect of the inward air flow 7 is lost possibly allowing the contaminants 10 to leak out from the workspace 3. According to the present embodiment, the glove panel 20 is installed to separate the workspace 3 from the outside space, so that the contaminants 10 in the workspace 3 are prevented from leaking out even when plural operators stand in front of the cabinet 1. Even though, in the present embodiment, the glove panel 20 is provided on the workspace 3 side of the front shutter 4, the same effect can be obtained also by providing the glove panel 20 in front of the front shutter 4.

Third Embodiment

Figure 8A:
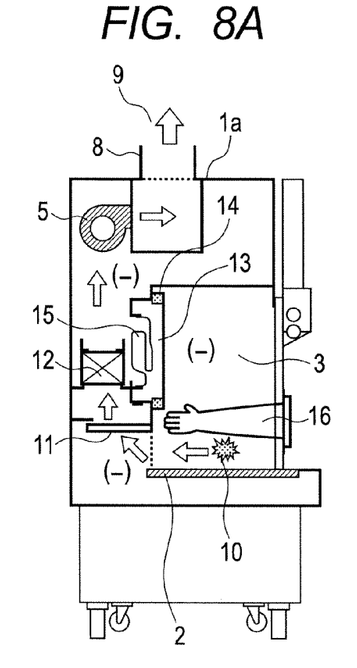
FIGS. 8A and 8B show a chemical hazard safety cabinet according to still another embodiment (a third embodiment) of the present invention, FIG. 8A being a longitudinal sectional view and FIG. 8B being a front view.
Figure 8B:
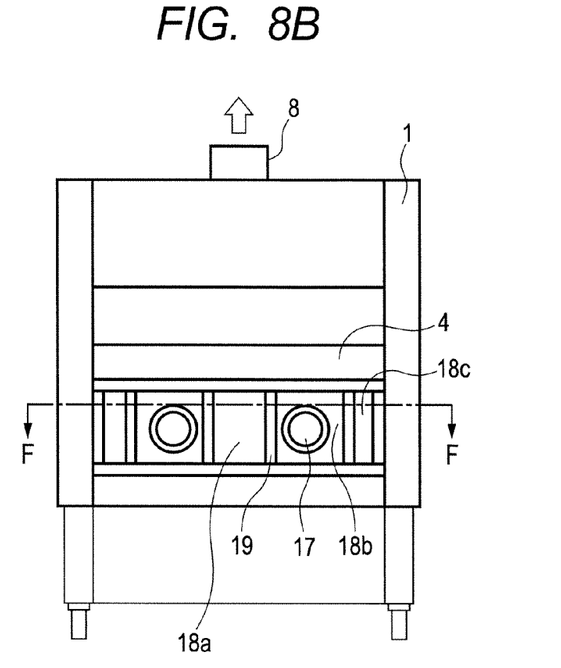
Figure 9:
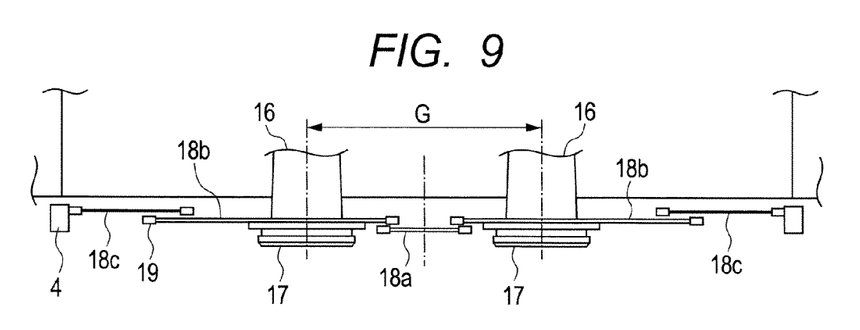
FIG. 9 is a horizontal sectional view of the front shutter of the cabinet shown in FIGS. 8A and 8B.

With reference to FIGS. 8A, 8B, and 9, a third embodiment of a chemical hazard safety cabinet according to the present invention will be described below. FIGS. 8A and 8B show a chemical hazard safety cabinet 1, FIG. 8A being a longitudinal sectional view and FIG. 8B being a front view. FIG. 9 is a sectional view, taken along line F-F in FIG. 8B, of a front shutter 4 included in the cabinet 1 shown in FIGS. 8A and 8B.

The third embodiment differs from the first embodiment in that glove ports 17 are provided not in a central small window 18a but in left and right small windows 18b. No glove port is provided in the small window 18a. The central small window 18a is positioned between the left and right small windows 18b. Distance G between the two gloves 16 can be changed.

The small window 18a and the small windows 18b are arranged to be partly overlapped. The small windows 18b and the small windows 18c are also arranged to be partly overlapped on each side of the small window 18a. The two small windows 18b are movable so that distance G between the two gloves 16 may be adjusted depending on the body type of the operator. Besides distance G is adjustable based on the body type of the operator, the small window 18a and small windows 18b as well as the small windows 18b and small windows 18c are partly overlapped. Therefore, changing distance G causes no opening to be formed between the small windows 18a to 18c.

Fourth Embodiment

Figure 10A:
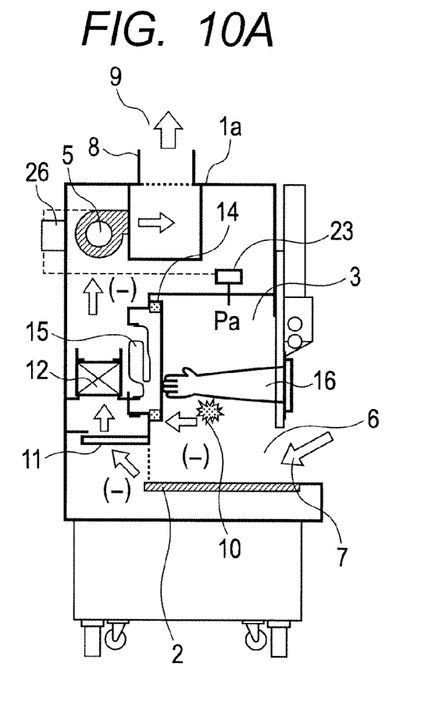
FIGS. 10A and 10B show a chemical hazard safety cabinet according to still another embodiment (a fourth embodiment) of the present invention, FIG. 10A being a longitudinal sectional view and FIG. 10B being a front view.
Figure 10B:
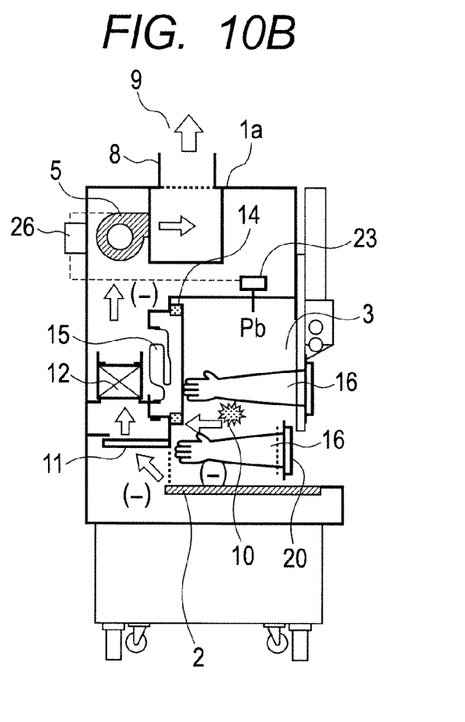
Figure 11:
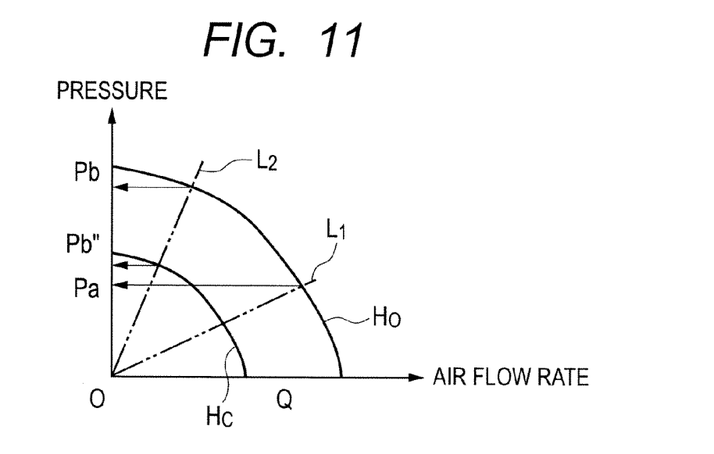
FIG. 11 is a diagram for describing air flow rate control performed in the cabinet shown in FIGS. 10A and 10B.

With reference to FIGS. 10A, 10B, and 11, a fourth embodiment of a chemical hazard safety cabinet according to the present invention will be described below. FIGS. 10A and 10B are longitudinal sectional views of a chemical hazard safety cabinet 1, FIG. 10A showing a state of operation performed with a front opening 6 kept open and FIG. 10B showing a state of operation performed with a glove panel 20 provided in a front opening 6. FIG. 11 is a diagram for describing the characteristic of a blower 5 which controls an inward air flow 7 in the above two states.

Referring to FIG. 10A, the front opening 6 is formed below a front shutter 4 and the blower 5 sucks air from a workspace 3 to form an inward air flow 7. Referring to FIG. 10B, the glove panel 20 is installed in the front opening 6, and the front shutter 4 is lowered thereby lowering the positions of the gloves 16 attached to the front shutter 4. In this state, the front opening 6 is almost air-tightly closed, so that the outside air sucked in by the blower 5 via the front opening 6 is reduced. As a result, pressure Pa in the workspace 3 in the state shown in FIG. 10A and pressure Pb in the workspace 3 in the state shown in FIG. 10B become different.

In the present embodiment, the blower 5 is assumed to have an ordinary fan characteristic represented, in FIG. 11, by the outer curve Ho. In the state shown in FIG. 10A in which the front opening 6 is provided, the pressure in the workspace 3 is Pa and the blower load is $L_1$. In the state shown in FIG. 10B in which the glove panel 20 is installed, the resistance against air sucking increases and the pressure in the workspace 3 rises to Pb thereby increasing the blower load to $L_2$. Pressures Pa and Pb in the workspace 3 into which air is sucked in are both negative. When, as shown in FIG. 10B, the workspace 3 is separated from the outside space by installing the glove panel 20, the pressure in the workspace 3 continues lowering. When, in such a state, the blower 5 continues sucking air from the workspace 3 separated from the outside space, the cabinet 1 may be, depending on its construction, vibrated by a forcefully formed inward air flow.

In the present embodiment, to address the above problem, a differential pressure sensor 23 to detect a negative pressure is provided in a boundary portion of the workspace 3. The differential pressure sensor 23 measures the pressure difference between the pressure in the workspace 3 and the pressure on the secondary side (on the blower 5 side) of a HEPA filter 12 or between the pressure in the workspace 3 and the pressure at outside the cabinet 1. When, for example, as a result of installing the glove panel 20, the differential pressure sensor 23 detects that the pressure in the workspace 3 has risen to Pb, the output of the blower 5 is controlled by controlling the operating frequency of or the voltage applied to an inverter 26 driving the blower 5 so as to operate the blower 5 in accordance with a controlled blower characteristic Hc represented, in FIG. 11, by the inner solid-line curve. As a result, the pressure in the workspace 3 lowers to Pb" between pressures Pa and Pb. This prevents the blower 5 from excessively sucking air and contributes toward energy saving. By monitoring the differential pressure between the inside of the workspace 3 and the secondary side of the HEPA filter 12, the life (clogging) of the HEPA filter 12 can also be monitored.

Even though, in the present embodiment, the differential pressure sensor 23 is used, the output of the blower 5 may be controlled also by attaching a detector to detect the glove panel 20 to a grooved holding member 22 or by installing a limit switch to detect the position of the front shutter 4.

According to the above embodiments of the present invention, a chemical hazard safety cabinet is provided as a biosafety cabinet which allows operation to be performed, depending on the degree of hazard of contaminants to be handled, either through a front opening or using sealed gloves whose positions are variable. This improves the workability of operation performed using a biosafety cabinet.

What is claimed is:

1. A biosafety cabinet comprising:
   an air exhaust unit for discharging air in a workspace formed in a main body cabinet to outside via a filter;
   a front shutter vertically movably installed on a front of the workspace; and
   a front opening formed below the front shutter at the front of the workspace, wherein
   the front shutter comprises:
   a plurality of transparent small windows which are laterally movable, a rectangular small-window frame being provided at a first end of a first transparent small window from among the plurality of the transparent small windows, a projection being provided on at least one of a first end and a second end of a second transparent small window frame of a second transparent small window from among the plurality of the transparent small windows, the second transparent small window being different from the first transparent small window, and a pair of gloves for use in operation in the workplace being provided on the first transparent small window, wherein:

the rectangular small-window frame of the first transparent small window is in contact with the second transparent small window such that the first transparent small window overlaps the second transparent small window to maintain an air-tight seal in the workspace, and the rectangular small-window frame of the first transparent small window is in contact with the projection of the second transparent small window frame to maintain an air-tight seal in the workplace when the first transparent small window and the second transparent small window move laterally.

2. The biosafety cabinet according to claim 1, wherein only one of the plurality of transparent small windows is attached with the pair of gloves.

3. The biosafety cabinet according to claim 2, further comprising a differential pressure sensor for detecting a differential pressure between a pressure in the workspace and a pressure outside the biosafety cabinet or between the pressure in the workspace and a pressure at downstream of the filter and a control unit for controlling an output of the exhaust unit according to a differential pressure signal inputted from the differential pressure sensor.

4. The biosafety cabinet according to claim 2, further comprising a glove panel removably installed in the front opening to be below the front shutter, the glove panel being attached with a glove.

5. The biosafety cabinet according to claim 2, wherein a holding groove is provided on each lateral side of the front opening, the holding groove being for removably holding a corresponding lateral end portion of a laterally outermost one of the plurality of transparent small windows on each side.

6. The biosafety cabinet according to claim 5, further comprising a glove panel removably installed in the front opening to be below the front shutter, the glove panel being attached with a glove.

7. The biosafety cabinet according to claim 1, wherein two of the plurality of transparent small windows are each attached with one of the gloves.

8. The biosafety cabinet according to claim 7, wherein a holding groove is provided on each lateral side of the front opening, the holding groove being for removably holding a corresponding lateral end portion of a laterally outermost one of the plurality of transparent small windows on each side.

9. The biosafety cabinet according to claim 7, further comprising a differential pressure sensor for detecting a differential pressure between a pressure in the workspace and a pressure outside the biosafety cabinet or between the pressure in the workspace and a pressure at downstream of the filter and a control unit for controlling an output of the exhaust unit according to a differential pressure signal inputted from the differential pressure sensor.

10. The biosafety cabinet according to claim 7, further comprising a glove panel removably installed in the front opening to be below the front shutter, the glove panel being attached with a glove.

11. The biosafety cabinet according to claim 1, wherein a holding groove is provided on each lateral side of the front opening, the holding groove being for removably holding a corresponding lateral end portion of a laterally outermost one of the plurality of transparent small windows on each side.

12. The biosafety cabinet according to claim 11, further comprising a differential pressure sensor for detecting a differential pressure between a pressure in the workspace and a pressure outside the biosafety cabinet or between the pressure in the workspace and a pressure at downstream of the filter and a control unit for controlling an output of the exhaust unit according to a differential pressure signal inputted from the differential pressure sensor.

13. The biosafety cabinet according to claim 11, further comprising a glove panel removably installed in the front opening to be below the front shutter, the glove panel being attached with a glove.

14. The biosafety cabinet according to claim 1, further comprising a differential pressure sensor for detecting a differential pressure between a pressure in the workspace and a pressure outside the biosafety cabinet or between the pressure in the workspace and a pressure at downstream of the filter and a control unit for controlling an output of the exhaust unit according to a differential pressure signal inputted from the differential pressure sensor.

15. The biosafety cabinet according to claim 1, further comprising a glove panel removably installed in the front opening to be below the front shutter, the glove panel being attached with a glove.

* * * * *